No. 816,514. PATENTED MAR. 27, 1906.
C. E. TREWHELLA.
PERCOLATOR.
APPLICATION FILED AUG. 26, 1905.
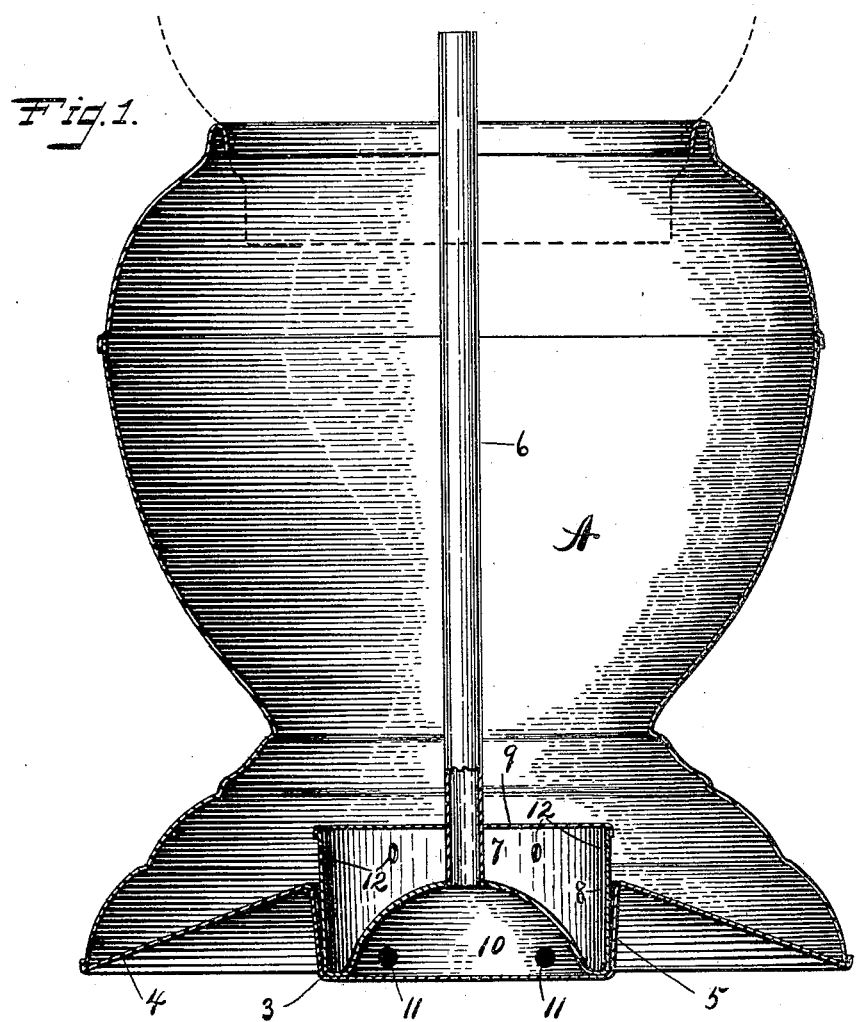
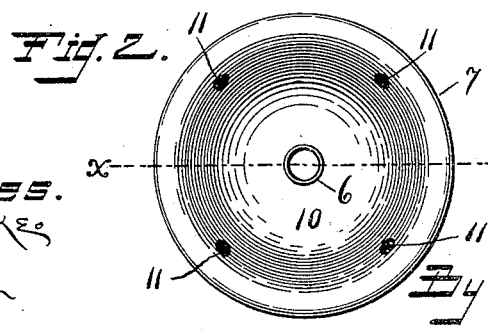
Witnesses.
S. H. Clarke
P. J. Egan
Inventor.
Charles E. Trewhella
By James Shepard
Atty.

UNITED STATES PATENT OFFICE.

CHARLES E. TREWHELLA, OF MERIDEN, CONNECTICUT, ASSIGNOR TO AMERICAN SILVER COMPANY, OF BRISTOL, CONNECTICUT, A CORPORATION.

PERCOLATOR.

No. 816,514.  Specification of Letters Patent.  Patented March 27, 1906.

Application filed August 26, 1905. Serial No. 275,864.

*To all whom it may concern:*

Be it known that I, CHARLES E. TREWHELLA, a citizen of the United States, residing at Meriden, in the county of New Haven and State of Connecticut, have invented certain new and useful Improvements in Percolators, of which the following is a specification.

My invention relates to improvements in percolators; and the objects of my improvement are simplicity and economy in construction and efficiency in use, especially with reference to a construction whereby the water in the reservoir is prevented from boiling.

In the accompanying drawings, Figure 1 is a central vertical section of my percolator on the line $x\,x$ of Fig. 2 with a portion thereof in elevation. Fig. 2 is a reverse plan view of the fountain of the said percolator as detached from the vessel or reservoir.

A designates a vessel within which water is placed, and therefore I call the said vessel the "reservoir." It may in the main be of any ordinary or desired shape. I form a central depression 3 in the bottom 4, the said depression being shallow and having substantially vertical side walls 5 of a circular form in plan view. The usual strainer and upper vessel is indicated by broken lines at the upper part of Fig. 1. Any ordinary or desired construction may be employed for the said upper vessel.

The fountain consists of the tube 6 and chamber 7, the said chamber being deeper vertically than the central depression 3 and having substantially vertical sides 8 to fit and close the said central depression, as shown. The top 9 of this fountain-chamber may be flat and is imperforate, while the bottom 10 is of a dishing or concave form, so as to form a chamber between the said bottom and the bottom of the central depression. This concave bottom is provided with perforations 11, the same, as shown, being four in number. The vertical sides 8 of the fountain-chamber are provided with perforations 12 of about the same size as the perforations 11 and, as shown, twice as many. The fountain-tube passes down through the fountain-chamber and is made tight, so as to have no direct communication therewith, but opens at its lower end into the central depression 3 of the main vessel or reservoir. The upper end of the fountain-tube may be left plain and throw the liquid directly upward, but it is adapted to receive any desired nozzle or spreading device, the said nozzle or device not forming any part of the present invention. The fountain chamber and tube are readily detachable from the main vessel and may be lifted out and inserted by taking hold of the upper end of the tube. When inserted, the outer edge of its bottom rests upon the bottom of the central depression 3, while its sides fit so closely to the sides of the said depression as to close the chamber formed in the said central depression below the concave bottom of the fountain-chamber.

A suitable supply of water is placed in the vessel A, and the upper vessel, with coffee or other material for making an infusion, is put in place with the upper end of the tube passing upwardly through and above the said material. The water in the reservoir will pass through the holes in the fountain-chamber and into the central depression. Upon heating the water in the said central depression to the proper degree (preferably by means of a lamp) hot water will be forced upwardly from the central depression and out at the upper end of the fountain-tube, then falling on the material to be infused may percolate therethrough and fall back into the reservoir. A fresh supply of water or infusion from the reservoir will flow into the fountain-chamber through the side holes 12 and from the said fountain-chamber through the holes 11 into the central depression, whereby the fountain may be operated as long as may be desired.

While the precise construction shown is not supposed to be necessary, it has been demonstrated that this construction is efficient, and no matter how hot the water in the central depression may be heated the water in the reservoir or main part of the vessel never boils.

I claim as my invention—

1. In a percolator, the combination of a vessel having a central depression in its bottom with the fountain chamber and tube, the said fountain-chamber being deeper than the said depression and provided with side perforations at a point above the side wall of the said central depression, and with a perforated concave bottom from which the tube extends, whereby the main vessel is divided into three separate chambers that communicate with each other through the perforations in the said side wall and concave bottom, substantially as described.

2. In a percolator, the combination of a vessel with a fountain-chamber fitted thereto, the said chamber having an imperforate top, perforated sides and a concave bottom having perforations, the perforations in the sides and bottom both opening into the said chamber, and a fountain-tube extending upwardly from below the said concave bottom and through the fountain-chamber, whereby the liquid flowing to the lower end of the said tube passes from the main chamber of the vessel through the said fountain-chamber.

CHARLES E. TREWHELLA.

Witnesses:
JAMES SHEPARD,
SHEFFIELD H. CLARKE.